United States Patent
Odebrecht

(10) Patent No.: US 6,261,173 B1
(45) Date of Patent: Jul. 17, 2001

(54) OPEN VEHICLE

(75) Inventor: Wolfgang Odebrecht, Sindelfingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/514,280

(22) Filed: Feb. 28, 2000

(30) Foreign Application Priority Data

Feb. 26, 1999 (DE) .............................................. 199 08 502

(51) Int. Cl.$^7$ ...................................................... B60H 1/26
(52) U.S. Cl. .............................. 454/151; 165/42; 165/44; 454/154
(58) Field of Search .................................... 454/120, 151, 454/156, 159, 161; 165/42, 43, 44

(56) References Cited

U.S. PATENT DOCUMENTS

| | | | |
|---|---|---|---|
| 1,177,022 | * | 3/1916 | Crist .................................. 454/161 X |
| 2,970,456 | * | 2/1961 | Rice .................................. 454/151 X |
| 4,072,487 | * | 2/1978 | Irwin ................................. 454/151 X |
| 4,401,013 | * | 8/1983 | Ohashi et al. ..................... 454/159 X |
| 5,137,326 | * | 8/1992 | George . |
| 5,738,404 | * | 4/1998 | Stadler et al. . |
| 5,839,774 | * | 11/1998 | Hack et al. . |

FOREIGN PATENT DOCUMENTS 197 00 739    1/1997  (DE) .

* cited by examiner

Primary Examiner—Harold Joyce
(74) Attorney, Agent, or Firm—Evenson, McKeown, Edwards & Lenahan, P.L.L.C.

(57) ABSTRACT

An open motor vehicle, such as a convertible or a roadster, has at least one vehicle seat accommodated in a vehicle interior. A wind partition is assigned to the at least one vehicle seat and is arranged behind the backrest covering at least the headrest area. A heating system which has at least one heat exchanger through which at least a portion of the air flows which reaches the wind partition. For supplying the headrest area with warm air during a drive with an open top without an intervention in the wind partition and an impairment of the design, the at least one heat exchanger is integrated in a shaft constructed in the vehicle interior behind the backrest. The shaft is provided with an air inflow device which is situated upstream of the heat exchanger and with an air outflow device situated downstream of the heat exchanger. The air inflow device is arranged and constructed such that, as the result of the air stream entering behind the wind partition into the vehicle interior, an airflow is generated therein which penetrates the heat exchanger. The air outflow device is arranged and constructed such that the air flow is directed to the headrest area.

28 Claims, 1 Drawing Sheet

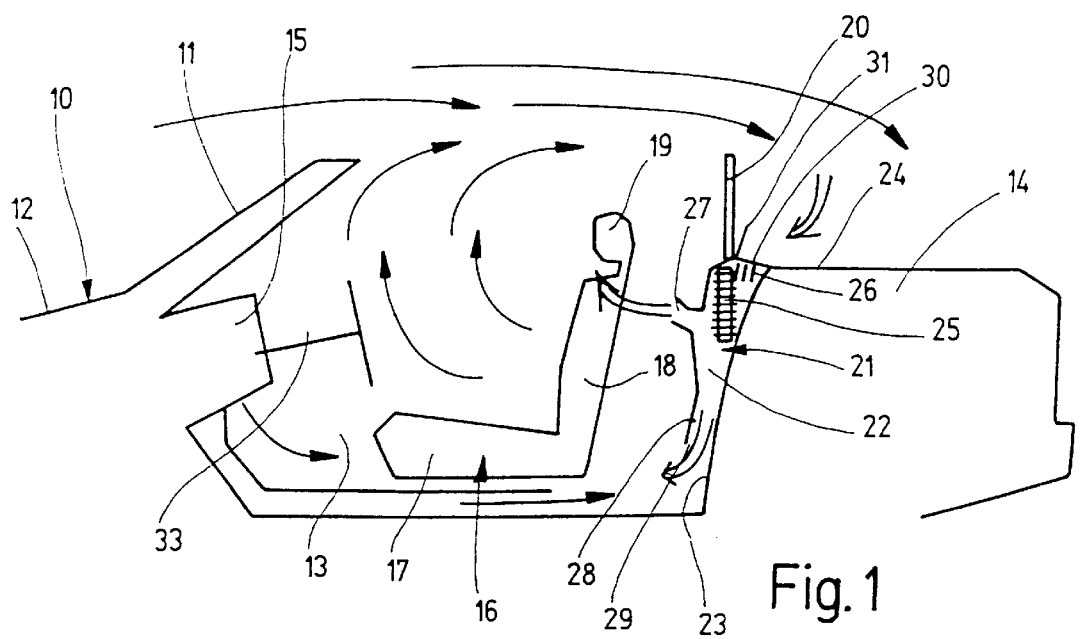
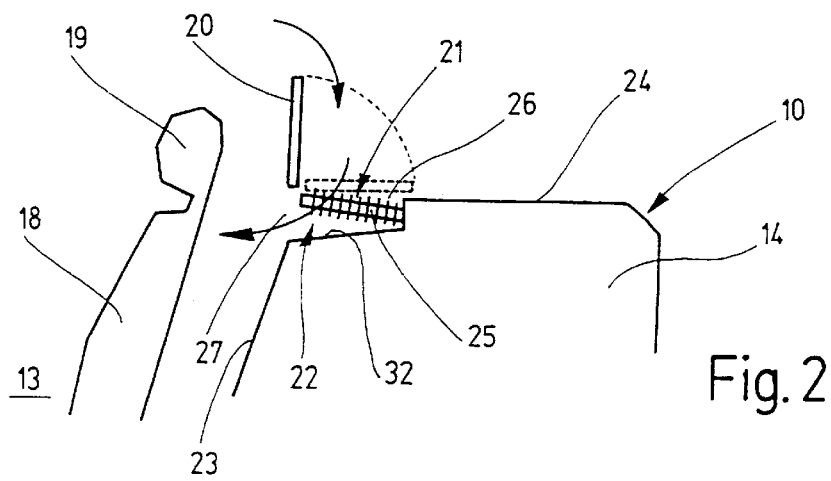
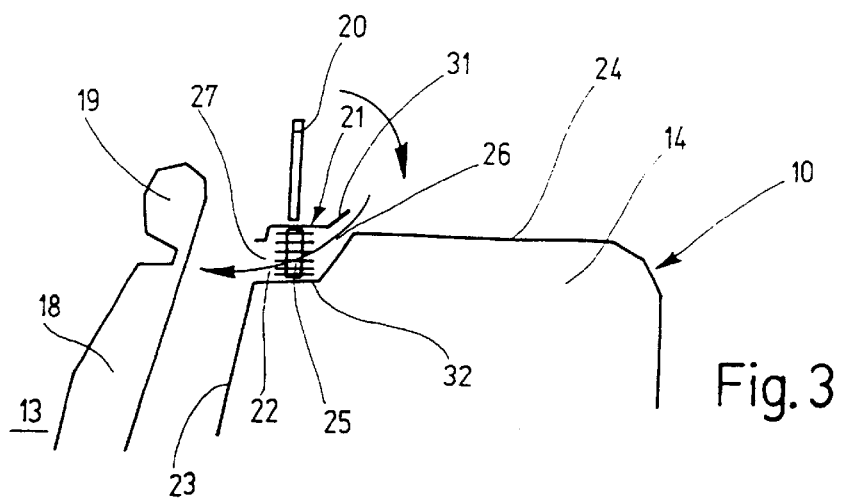

OPEN VEHICLE

BACKGROUND AND SUMMARY OF THE INVENTION

The invention relates to an open motor vehicle, such as a convertible or roadster, having at least one vehicle seat accommodated in a vehicle interior which has a backrest and a headrest, having a wind partition which is assigned to the at least one seat and which is arranged behind the backrest covering at least the headrest area, and having a heating system which has at least one heat exchanger through which at least a portion of the air flows which reaches the wind partition.

In the case of a known motor vehicle of this type (German Patent Document No. 197 00 739 C1), the flatly designed heat exchanger extends directly over a portion of the effective surface of the wind partition. In one embodiment, the heat exchanger is integrated in the form of an electric resistance wire mesh into the wind partition. In another embodiment, the flatly constructed heat exchanger is joined as an inherently rigid structure in parallel onto the wind partition and is connected with the latter by means of fastening elements. The heat exchanger is either heated electrically or is operated by means of a liquid or gaseous medium in a heat transmission circuit. The heating output is controlled as a function of the driving speed.

By means of such a heated wind partition, an open driving is permitted even at low outside temperatures because the air, which, as the result of the reverse flow of the air stream flowing through the wind partition from its rear side, is heated and warms the vehicle occupant in the particularly sensitive neck and shoulder region.

It is an object of the invention to ensure, in the case of a vehicle of the initially mentioned type, the advantageous supply of warm air to the headrest area without an intervention into the wind partition and thus ensure freedom with respect to the design of the wind partition.

In the case of a vehicle of the type referred to above, this object is achieved by providing an arrangement wherein the at least one heat exchanger is integrated in a shaft or air flow channel constructed in the vehicle interior behind the backrest.

The motor vehicle according to the invention has the advantage that the heating system is not arranged in or on the wind partition itself and therefore does not impair or interfere with design efforts for obtaining an attractive wind partition, but is arranged in the vehicle interior and can be covered there in a very simple manner by means of a covering or padding. The heating system operates dynamically while utilizing the reverse flow of the air stream behind the partition and requires no separate fan, which, however, can be provided optionally, in order to obtain the heating comfort when driving extremely slowly or when stopped.

Advantageous embodiments of the motor vehicle according to the invention with expedient further developments of the invention are described herein and in the claims.

According to an advantageous feature of the preferred embodiments of the invention, an air duct which leads to the leg space is branched off the shaft below the air outflow device, which air duct is provided at the free end with an outlet opening. As a result, the leg space below the vehicle seat is additionally heated, which is advantageous particularly for four-seat convertibles.

According to certain preferred embodiments of the invention, the shaft accommodating the heat exchanger is arranged on the interior back wall extending vertically behind the vehicle seat. The shaft can very easily be accommodated and visually covered there, so that it is invisible.

In an alternative embodiment of the invention, the shaft is constructed in an indentation which extends along the whole width of the interior and which starts from the rearward board edge and extends to the rear wall of the interior. This construction of the shaft is advantageous for a two-seat open motor vehicle, in the case of which the backrests close off directly with the rear wall of the interior and therefore no clearance exists between the backrest and the rear wall.

Other advantages, features, and details of the invention will be found in the description below in which a number of embodiments of the invention are described in detail with reference to the drawings. The features referred to in the claims and the specification may be important to the invention individually or in any combination.

BRIEF DESCRIPTION OF THE DRAWINGS

FIG. 1 is a schematic cutout-type lateral view of a convertible with removed vehicle doors constructed according to a preferred embodiment of the invention;

FIG. 2 is a schematic partial cutout type lateral view similar to FIG. 1, showing a second preferred embodiment of the invention, and FIG. 3 is a schematic partial cutout type lateral view similar to FIG. 1, showing a third preferred embodiment of the invention.

DETAILED DESCRIPTION OF THE DRAWINGS

Of the convertible outlined in FIG. 1 as an embodiment of an open motor vehicle in a cutout-type lateral view, the vehicle body 10 is schematically illustrated having a windshield 11, an engine hood 12, a vehicle interior 13 and a rearward structure 14. On the forward side, the vehicle interior 14 is equipped with a dashboard 15 and accommodates two vehicle seats 16, of which only the vehicle seat assigned to the steering wheel is illustrated. The vehicle seat 16, which is longitudinally adjustably fastened in the vehicle interior, normally has a seat cushion 17, a backrest 18 and a headrest 19. The front passenger seat has an identical design.

In order to reduce the draft air for the vehicle occupants in an open vehicle; thus, when the top of the convertible is folded away, a so-called wind partition 20 is assigned to the vehicle seats 16 which reduces the reverse flow of the air stream toward the front into the vehicle interior which occurs during the drive as the result of the suction effect.

In order to make driving with an open top more pleasant, particularly in cooler temperatures, a heating system 21 is provided behind the vehicle seats 16 below the wind partition 20, which heating system supplies warm air to the headrest area of the vehicle seats 16 and, when the vehicle seats are occupied, warms the particularly sensitive shoulder and neck area of the vehicle occupants.

The heating system 21 comprises a shaft 22, which, in the embodiment of FIG. 1, is arranged below the wind partition 20 on the rear wall 23 of the vehicle interior 13 and extends to the board edge 24 of the rearward structure 14. A heat exchanger 25 is arranged in the shaft 22, which heat exchanger can be electrically heated or operated with a liquid or gaseous medium in a heat transmission circuit. The shaft 22 has an air inflow device 26 which is situated upstream of the heat exchanger 25 in the flow direction; an air outflow device 27 situated downstream of the heat exchanger; as well as an air duct 28 branching off below the air outflow device 27, which air duct 28 leads into the leg space and is provided at the free end with an outlet opening 29. The air inflow device 26, which is covered by a grid 30 flush with the board edge 24 of the rearward structure 14, is arranged and constructed such that, by means of the air stream entering the vehicle interior 13 behind the wind partition 20, an air flow is generated therein which penetrates the heat exchanger 25. The inlet opening of the air inflow device 26 can be completely closed or partially or completely opened up by means of a control flap 31. The air outflow device 27 is arranged and constructed such that the air flow flowing out of it is directed into the area of the headrests 19 and the upper edge of the backrest 18. In an alternative embodiment, the air outflow device 27 may also be swivellably held on the shaft 22, so that the air outlet direction can be adjusted in a targeted manner and according to individual requirements of the vehicle occupants.

When driving with an open top, while utilizing the air stream, air flows by way of the wind partition 20 or past the wind partition 20 into the air inflow device 26 of the shaft 22 and flows through the heat exchanger 25, where it is heated. The warm air leaves the shaft 22, on the one side, in the direction of the headrest area and here warms the shoulder and neck region of the vehicle occupants and flows, on the other side, in the leg space under the seat cushion 17 and supplies heat in addition to the forward heating system. Particularly as the result of the warm air supply to the headrest area, the vehicle occupants will feel no drafts, which considerably increases their comfort and corresponds to the desire of many vehicle occupants to drive with the top down also when the weather is cool. The heating for thermally assisting the rearward area by way of the wind partition 20 is purely dynamic because, in conjunction with the wind partition 20, the pressure conditions provide a reliable flow through the heat exchanger 25. The flow is a function of the speed and, if the air guidance and the temperature are correct, a constant impression of climatic comfort can be achieved over wide speed ranges. In addition, as the result of flaps, which can be closed and throttled, on the air inflow device 26, the air outflow device 27 and in the air duct 28, the flowing-out air quantities can be controlled as a function of suitable parameters. The purely dynamic heating requires no additional fan. If a fan is nevertheless optionally provided which is connected on the delivery side or suction side to the shaft 22, the warm-air supply to the headrest area can be maintained also when the vehicle is stopped or is driving extremely slowly.

In the case of the embodiment of a convertible schematically illustrated in FIG. 2, the shaft 22 of the heating system 21 is constructed in an indentation 32 of the vehicle body 10, which is sunk in from the board edge 24 of the rearward structure 14 and extends to the rear wall 23 of the interior. The indentation 22 extends along the whole width of the vehicle interior 13. The heat exchanger 25 is aligned largely horizontally and completely covers the inflow opening of the air inflow device 26. The indentation 32 and the wind partition 20 are coordinated such with one another that the wind partition 20 swivelled away onto the rearward structure 14 completely covers the inflow opening of the air inflow device 26, as indicated by a dash-dotted line in FIG. 2. The outflow opening of the air outflow device 27 is situated directly on the rear wall 23 of the vehicle interior 13 behind the lower headrest area.

The heating system 21 of the embodiment according to FIG. 3 differs from the heating system 21 in FIG. 2 in that the heat exchanger 25 is not aligned horizontally but vertically in the indentation 32 forming the shaft 22. The inflow opening of the air inflow device 26 can be closed or opened up completely or partially by means of the control flap 31. The outflow opening of the air outflow device 27 is arranged flush with the rear wall 23 of the vehicle interior 13 and again behind the lower headrest area.

The heating system 21 modified in FIGS. 2 and 3 is suitable for two-seat open vehicles, in the case of which sufficient space does not exist for the accommodation of the shaft 22, which exists in FIG. 1, between the backrest 18 of the vehicle seats 16 and the rear wall 23 of the vehicle interior 13. Such two-seaters are particularly the so-called roadsters. However, the method of operation of these two heating systems 21 is similar to the method of operation of the heating system 21 described in FIG. 1.

In the case of all heating systems 21 according to FIGS. 1 to 3, the heat exchanger 25 extends along the whole width of the vehicle interior 13. However, as an alternative, several shorter heat exchangers may also be provided which are arranged side-by-side along the width of the vehicle interior 13.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Open motor vehicle, such as a convertible or a roadster, having at least one vehicle seat accommodated in the vehicle interior which has a backrest and a headrest, having a wind partition which is assigned to the at least one seat and which is arranged behind the backrest covering at least the headrest area, and having a heating system which has at least one heat exchanger through which at least a portion of the air flows which reaches the wind partition, wherein the at least one heat exchanger is integrated in a shaft constructed in the vehicle interior behind the backrest, wherein the shaft has an air inflow device situated in the flow direction upstream of the heat exchanger and an air outflow device situated downstream of the heat exchanger, wherein the air inflow device is arranged and constructed such that, by means of the air stream entering behind the wind partition into the vehicle interior, an air flow is generated therein which penetrates the heat exchanger, and wherein the air outflow device is arranged and constructed such that the air flow is directed to the headrest area.

2. Vehicle according to claim 1, wherein the inflow opening of the air inflow device is covered by a grid which closes off flush with the vehicle body.

3. Vehicle according to claim 1, wherein a control flap for the complete or partial closing of the air inflow device is arranged at the inlet opening of the air inflow device.

4. Vehicle according to claim 2, wherein a control flap for the complete or partial closing of the air inflow device is arranged at the inlet opening of the air inflow device.

5. Vehicle according to claim 1, wherein the shaft is optionally connected to a fan.

6. Vehicle according to claim 2, wherein the shaft is optionally connected to a fan.

7. Vehicle according to claim 3, wherein the shaft is optionally connected to a fan.

8. Vehicle according to one of claim 1, wherein the air outflow device is swivellably held on the shaft for the targeted adjustment of the air outlet direction.

9. Vehicle according to one of claim 2, wherein the air outflow device is swivellably held on the shaft for the targeted adjustment of the air outlet direction.

10. Vehicle according to one of claim 3, wherein the air outflow device is swivellably held on the shaft for the targeted adjustment of the air outlet direction.

11. Vehicle according to one of claim 5, wherein the air outflow device is swivellably held on the shaft for the targeted adjustment of the air outlet direction.

12. Vehicle according to one of claim 1, wherein an air duct branches off the shaft below the air outflow device and leads into leg space of the vehicle interior, said air duct being provided with an outlet opening at its free end.

13. Vehicle according to one of claim 2, wherein an air duct branches off the shaft below the air outflow device and leads into leg space of the vehicle interior, said air duct being provided with an outlet opening at its free end.

14. Vehicle according to one of claim 3, wherein an air duct branches off the shaft below the air outflow device and leads into leg space of the vehicle interior, said air duct being provided with an outlet opening at its free end.

15. Vehicle according to one of claim 4, wherein an air duct branches off the shaft below the air outflow device and leads into leg space of the vehicle interior, said air duct being provided with an outlet opening at its free end.

16. Vehicle according to one of claim 5, wherein an air duct branches off the shaft below the air outflow device and leads into leg space of the vehicle interior, said air duct being provided with an outlet opening at its free end.

17. Vehicle according to claim 1, wherein the shaft is arranged on a rear wall of the interior which extends vertically behind the at least one vehicle seat.

18. Vehicle according to claim 2, wherein the shaft is arranged on a rear wall of the interior which extends vertically behind the at least one vehicle seat.

19. Vehicle according to claim 3, wherein the shaft is arranged on a rear wall of the interior which extends vertically behind the at least one vehicle seat.

20. Vehicle according to claim 5, wherein the shaft is arranged on a rear wall of the interior which extends vertically behind the at least one vehicle seat.

21. Vehicle according to claim 8, wherein the shaft is arranged on a rear wall of the interior which extends vertically behind the at least one vehicle seat.

22. Vehicle according to claim 12, wherein the shaft is arranged on a rear wall of the interior which extends vertically behind the at least one vehicle seat.

23. Vehicle according to claim 1, wherein the shaft is constructed in an indentation in the vehicle body which extends over the width of the interior, is sunk in from a board edge of a rearward structure and extends to a rear wall of the vehicle interior.

24. Vehicle according to claim 23, wherein the heat exchanger is largely horizontally aligned and completely covers the inflow opening of the air inflow device.

25. Vehicle according to claim 24, wherein the wind partition is swivellably arranged close to the inflow opening of the air inflow device such that, in its swivelling position swivelled away onto the board edge of the rearward structure, it completely covers the inflow opening of the air inflow device.

26. Vehicle according to claim 23, wherein a control flap for the complete or partial closing of the air inflow device is arranged at the inlet opening of the air inflow device.

27. Vehicle according to claim 23, wherein the shaft is optionally connected to a fan.

28. Vehicle according to claim 1, wherein the at least one heat exchanger extends along the whole width of the vehicle interior or in that several heat exchangers are arranged side-by-side such that together they cover the whole width of the vehicle interior.

* * * * *